US012808523B2

(12) United States Patent
Jurik et al.

(10) Patent No.: US 12,808,523 B2
(45) Date of Patent: Nov. 24, 2026

(54) QUICK RELEASE HANDLES FOR A LUMINAIRE

(71) Applicant: ROBE lighting s.r.o., Roznov pod Radhostem (CZ)

(72) Inventors: Pavel Jurik, Prostredni Becva (CZ); Josef Valchar, Prostredni Becva (CZ)

(73) Assignee: ROBE lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 19/405,841

(22) Filed: Dec. 2, 2025

(65) Prior Publication Data

US 2026/0098631 A1 Apr. 9, 2026

Related U.S. Application Data

(60) Provisional application No. 63/727,028, filed on Dec. 2, 2024.

(51) Int. Cl.
*F21V 21/40* (2006.01)
*F21V 21/30* (2006.01)

(52) U.S. Cl.
CPC .............. *F21V 21/40* (2013.01); *F21V 21/30* (2013.01)

(58) Field of Classification Search
CPC ........ F21V 21/30; F21V 21/40; F21V 21/108; F21V 19/02; F21V 21/14
See application file for complete search history.

(56) References Cited

U.S. PATENT DOCUMENTS 8,845,150 B2 * 9/2014 Brutsche ................. F21V 21/15 362/426
9,897,297 B2 * 2/2018 Brutsche ................. F21V 21/30
2009/0323364 A1 * 12/2009 Bornhorst ............... F21V 21/30 362/418
2013/0215629 A1 * 8/2013 Bornhorst ............... F21V 21/15 362/418

FOREIGN PATENT DOCUMENTS

CN 117190143 A 12/2023
EP 2469157 A1 6/2012

OTHER PUBLICATIONS

European Extended Search Report; Application No. 25220267.6; Apr. 7, 2026; 7 pages. (4660-10002).

* cited by examiner

*Primary Examiner* — William J Carter
(74) *Attorney, Agent, or Firm* — Conley Rose, P.C.; Brooks W Taylor; Matthew Gibson

(57) ABSTRACT

A luminaire system includes a luminaire having a yoke configured for rotation relative to a fixed enclosure of the luminaire. The yoke includes a yoke arm having a pair of handle sockets, each having an interior profile. The system also includes a removable handle having a body including a pair of body plates and a grip extending therebetween; a respective pair of handle hooks coupled to each body plate, and configured to engage a corresponding one of the handle sockets; a respective sliding plate coupled to and configured to slide along each body plate between a locked and an unlocked configuration, where a locking tongue is coupled to each sliding plate and is configured to extend from a proximal end of the removable handle to engage the interior profile of the handle socket in the locked configuration; and a pull bar coupled to each sliding plate and/or each locking tongue.

11 Claims, 7 Drawing Sheets

QUICK RELEASE HANDLES FOR A LUMINAIRE

CROSS-REFERENCE TO RELATED APPLICATION

This application claims priority to and the benefits of U.S. Provisional Patent Application No. 63/727,028 filed on Dec. 2, 2024, which is incorporated herein by reference in its entirety.

TECHNICAL FIELD OF THE DISCLOSURE

The disclosure generally relates to luminaires, and more specifically to a quick release handle system for an automated luminaire.

BACKGROUND

Some luminaires in the entertainment and architectural lighting markets include automated and remotely controllable functions. Such luminaires may be used in theatres, television studios, concerts, theme parks, night clubs, and other venues. A luminaire may provide control over the pan and tilt functions of the luminaire allowing an operator to control a direction that the luminaire is pointing and thus a position of the luminaire's light beam on a stage or in a studio. Such position control may be obtained via control of the luminaire's position in two orthogonal rotational axes, which may be referred to as pan and tilt. Some luminaires provide control over other parameters such as intensity, color, focus, beam size, beam shape, and/or beam pattern. Where such luminaires are remotely controllable, they may be referred to as automated luminaires. Such luminaires may have handles built into the yoke arms to facilitate handling, transportation, and/or rigging. These handles are not used during the operation of the luminaire and may restrict or otherwise interfere with movement of the luminaire. Also, such handles add to the weight and size of the luminaire.

SUMMARY

In a first embodiment, a luminaire system includes a luminaire having a yoke configured for rotation relative to a fixed enclosure of the luminaire. The yoke includes a yoke arm having a pair of handle sockets, each having an interior profile. The system also includes a removable handle having a body including a pair of body plates and a grip extending therebetween; a respective pair of handle hooks coupled to each body plate, and configured to engage a corresponding one of the handle sockets; a respective sliding plate coupled to and configured to slide along each body plate between a locked and an unlocked configuration, where a locking tongue is coupled to each sliding plate and is configured to extend from a proximal end of the removable handle to engage the interior profile of the handle socket in the locked configuration; and a pull bar coupled to each sliding plate and/or each locking tongue.

In a second embodiment, a removable handle for a luminaire includes a body comprising a pair of body plates and a grip extending therebetween; a respective pair of handle hooks coupled to each body plate, and configured to engage a corresponding handle socket of a yoke arm of a luminaire; a respective sliding plate coupled to and configured to slide along each body plate between a locked configuration and an unlocked configuration, where a locking tongue is coupled to each sliding plate and is configured to extend from a proximal end of the removable handle to engage an interior profile of the handle socket in the locked configuration; and a pull bar coupled to each sliding plate and/or each locking tongue.

BRIEF DESCRIPTION OF THE DRAWINGS

For a more complete understanding of this disclosure, reference is now made to the following brief description, taken in conjunction with the accompanying drawings in which like reference numerals indicate like features.

DETAILED DESCRIPTION

Preferred embodiments are illustrated in the figures, like numerals being used to refer to like and corresponding parts of the various drawings.

As explained above, some luminaires include carrying handles to facilitate handling, transportation, and/or rigging of the luminaire. These carrying handles are built into the yoke arms of such luminaires, but are not used during the operation of the luminaire. Such carrying handles add to the weight and size of the luminaire, and may also restrict or otherwise interfere with movement of the luminaire during operation. For example, luminaires may need to be spaced further apart on a bar or truss so as to avoid yoke handles on adjacent units colliding as the luminaires rotate.

Embodiments of the present disclosure address the foregoing by providing a removable handle for use with a luminaire. The removable handle(s) described herein are configured to be easily attached to and detached from the luminaire, and also to facilitate relatively straightforward retrofitting of legacy luminaire bodies (e.g., with a relatively low number of steps to install adequate mounting hardware on the legacy luminaire) to enable the removable handle(s) to be coupled thereto. A legacy luminaire may be a luminaire that is not yet configured to receive removable handles.

Providing such removable handles for a luminaire allows the luminaire to be more easily handled (e.g., unpacked from a road case, packed into the road case, transported) and rigged than a luminaire without handles. When the handles are removed from the luminaire (e.g., once the luminaire is rigged or packed), the weight and the physical dimensions of the luminaire are reduced. In some embodiments, the luminaire may include secondary mounting locations or handle sockets for the handles to be stowed once the luminaire has been handled and rigged. The secondary mounting locations may be on a non-rotating portion of the luminaire (e.g., a base of the luminaire) so that the handles do not add to the rotational mass of the luminaire nor restrict or otherwise interfere with movement of the luminaire during operation when stowed in the secondary mounting locations. Accordingly, the luminaire requires less clearance from adjacent luminaires, or is otherwise more maneuverable, in its rigged configuration, and also may be packed into a correspondingly smaller road case, which improves overall packing and storage efficiency. Providing such removable handles for a luminaire also allows the luminaire to retain a clean aesthetic appeal once installed, due to the lack of unsightly, permanently-attached handles extending from the luminaire. These and other embodiments are described in further detail below, with reference made to the accompanying figures.

Figure 1:
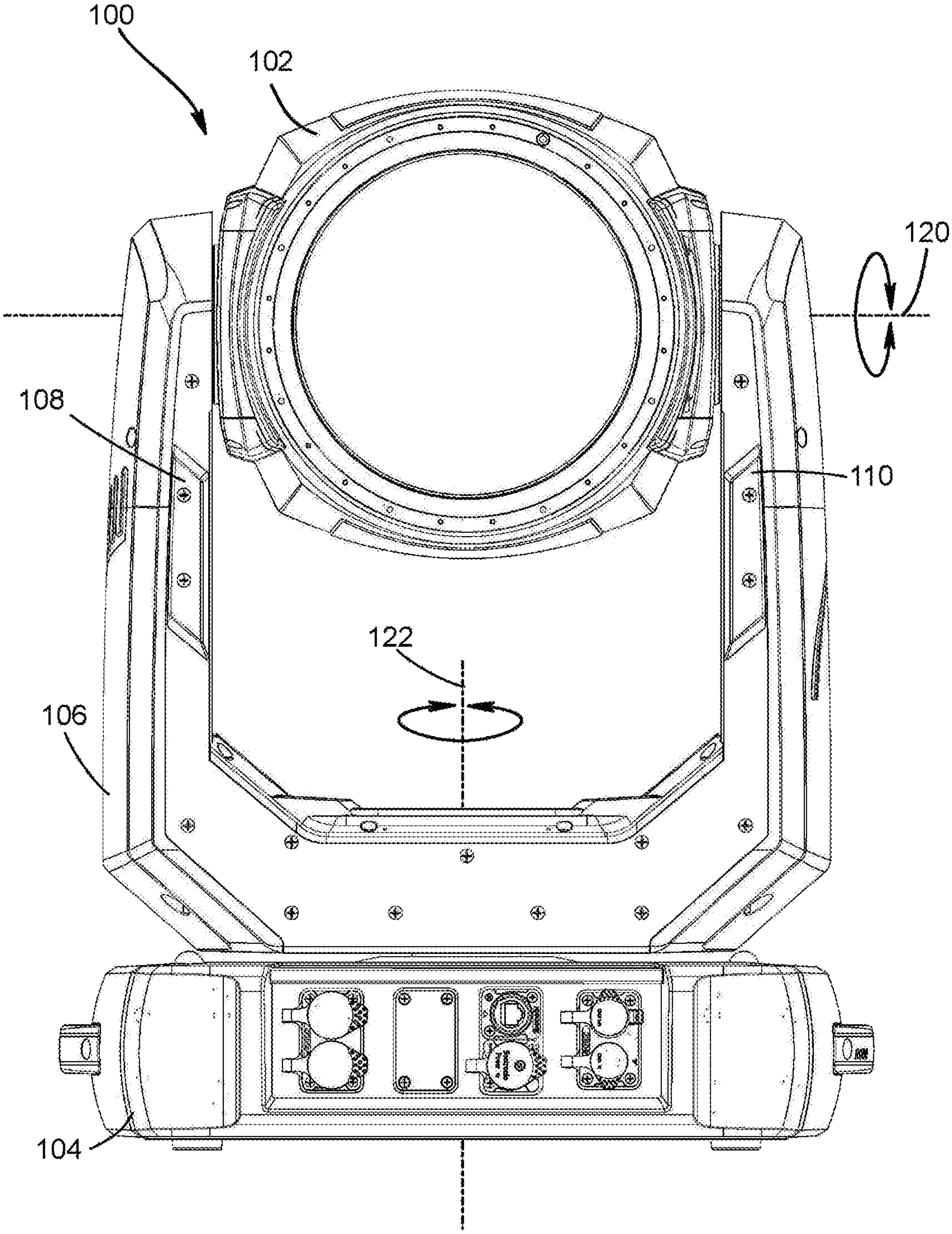
FIG. 1 illustrates a front view of a luminaire without attached handles according to an embodiment of the disclosure.

FIG. 1 presents a front view of a luminaire 100 according to an embodiment of the disclosure, without handles attached. The luminaire 100 comprises a head 102, which is configured to rotate within a yoke 106 about a tilt axis 120. The yoke 106 is configured to rotate relative to a fixed enclosure 104 (e.g., a base 104) about a pan axis 122. The tilt axis 120 and the pan axis 122 are orthogonal to each other. Both pan and tilt motions may be mechanically coupled to hand-operated manual controls or may be coupled for motion to motors, linear actuators, or other electromechanically controlled mechanisms. Such electromechanical mechanisms may be under the control of a microcontroller or other programmable processing system included in the light fixture. In some embodiments, the processing system may be controlled locally via a user interface included in the light fixture. In other embodiments, the processing system may be in wired or wireless communication with a remotely located control console that an operator uses to indicate a desired position of the head 102. In such embodiments, the operator is able to direct light output from the automated luminaire 100 in a desired direction, through motion of the head 102 in the pan axis 122 and tilt axis 120. As shown in FIG. 1, the luminaire 100 also includes handle sockets 108, 110 on the yoke 106. Although not depicted, corresponding handle sockets may also be included on the back of each side of the yoke 106. As described further below, the handle sockets 108, 110 are configured to receive a removable handle, and thus facilitate ease of handling, transportation, and/or rigging of the luminaire 100.

Figure 2:
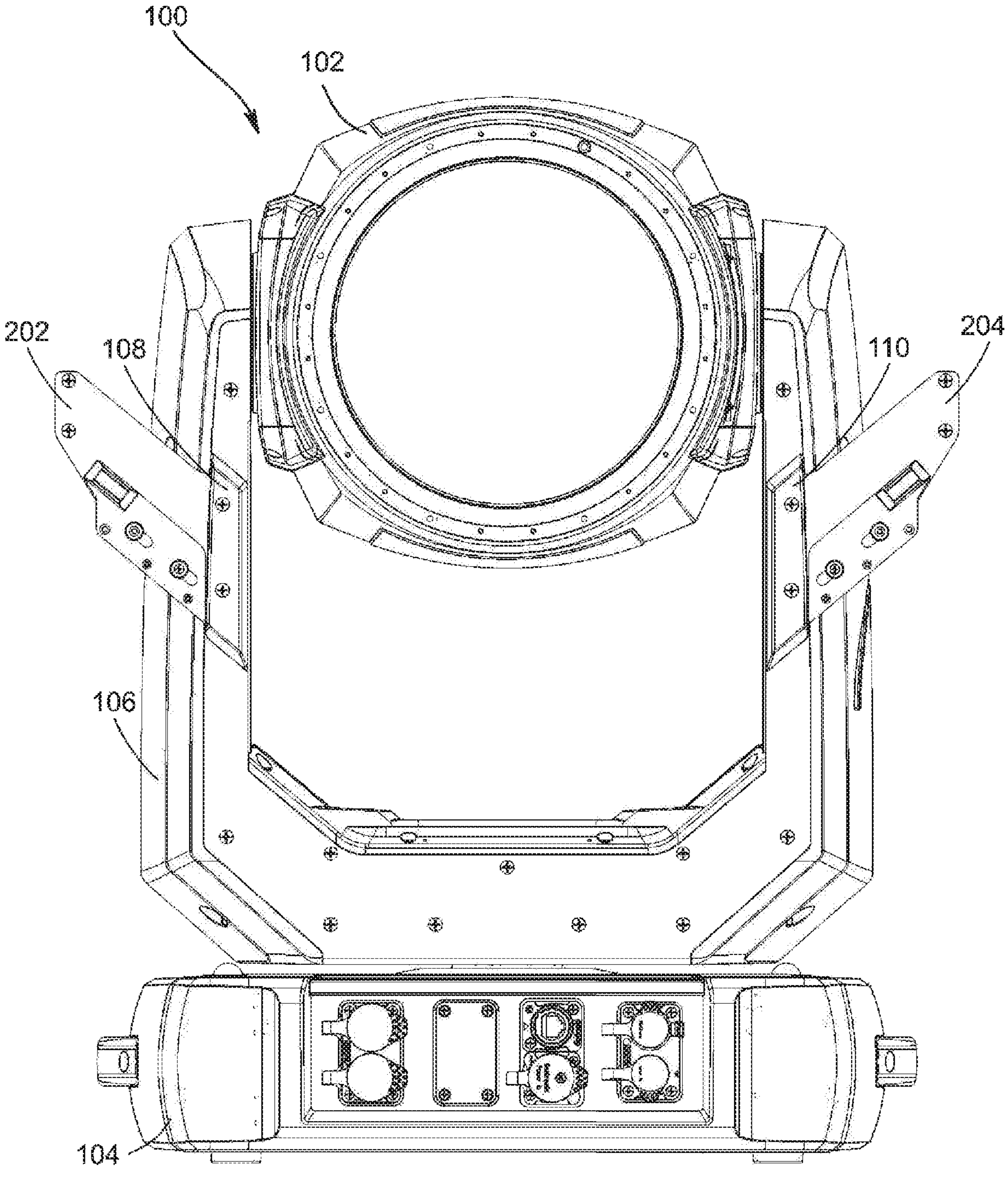
FIG. 2 illustrates a front view of a luminaire with removable handles attached thereto according to an embodiment of the disclosure.

FIG. 2 presents a front view of the luminaire 100 according to an embodiment of the disclosure, with removable handles 202, 204 attached. The removable handles 202, 204 may be constructed out of any material(s) that are suitably strong to facilitate handling, transportation, and/or rigging of the luminaire 100. In particular, the removable handles 202, 204 are attached to the handle sockets 108, 110, respectively. As explained above, although not shown, the removable handles 202, 204 may be similarly attached to corresponding handle sockets on the back of each side of the yoke 106. In the example of FIG. 2, and generally throughout this disclosure, a removable handle may be attached to each arm of the yoke 106. For example, in FIG. 2, the removable handle 202 is shown attached to the left arm of the yoke 106, while the removable handle 204 is shown attached to the right arm of the yoke 106. However, in other embodiments the number of handles may be different, and the scope of the present disclosure should not be interpreted as being limited to a particular number of handles.

In some embodiments, the luminaire 100 may include secondary mounting locations or handle sockets for the handles 202, 204 to be stowed once the luminaire 100 has been handled and rigged, and the handles 202, 204 have thus been removed from the handle sockets 108, 110. The secondary handle sockets are not explicitly shown in FIG. 2, but may be similar in design to the sockets 108, 110, but located on a non-rotating portion of the luminaire 100 (e.g., the base 104). Accordingly, when the handles 202, 204 are stowed in the secondary handle sockets, the handles 202, 204 do not add to the rotational mass of the luminaire 100 (i.e., as would be the case when mounted to the handle sockets 108, 110 on the yoke 106). Also, when the handles 202, 204 are stowed in the secondary handle sockets, the handles 202, 204, the handles 202, 204 do not restrict or otherwise interfere with movement of the luminaire 100 during operation.

Figure 3:
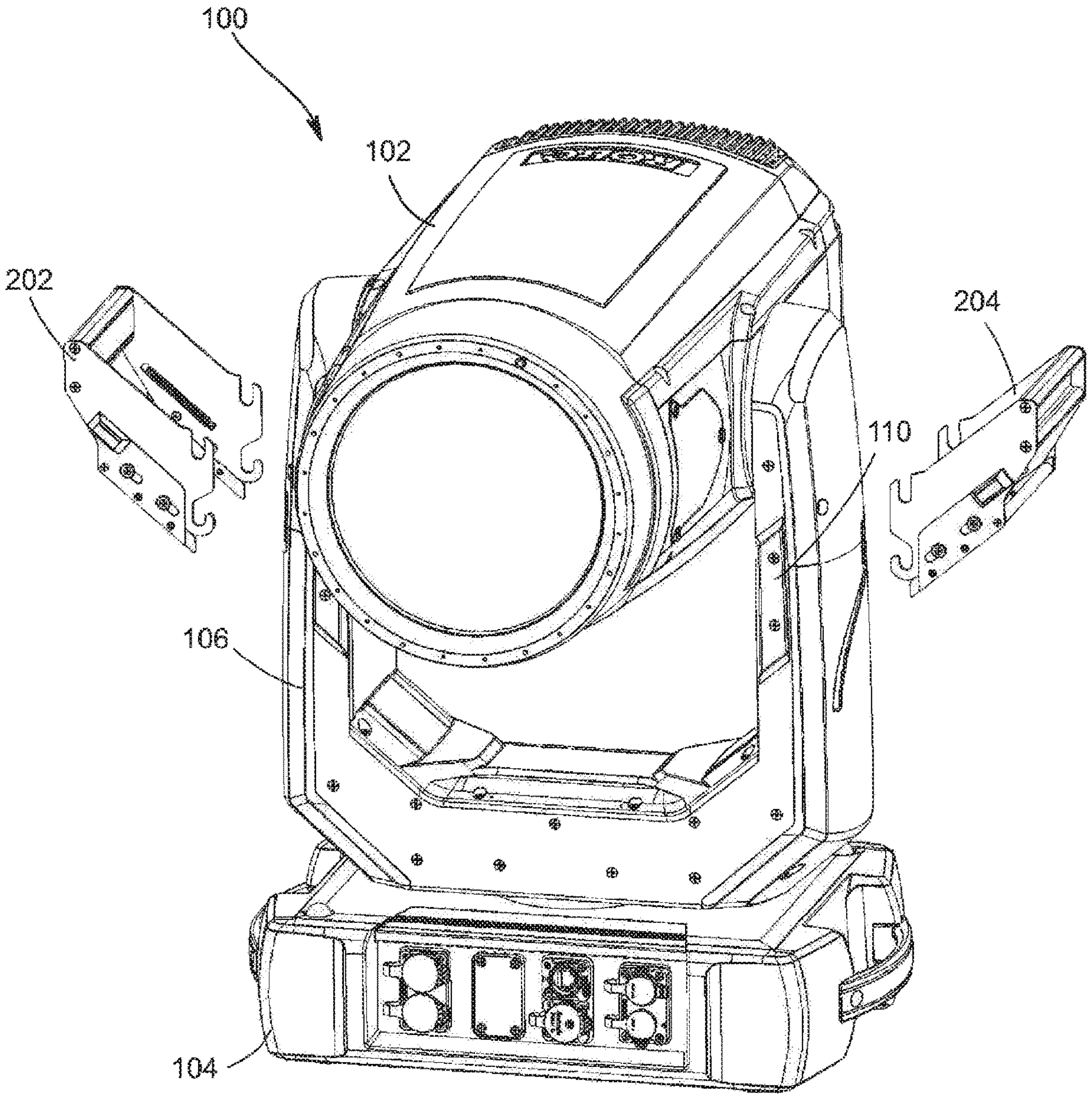
FIG. 3 illustrates a partially exploded view of a luminaire showing removable handle placement according to an embodiment of the disclosure.

FIG. 3 presents a partially exploded view of the luminaire 100, which illustrates the removable handles 202, 204 spaced apart (e.g., removed) from the yoke 106 according to an embodiment of the disclosure.

Figure 4:
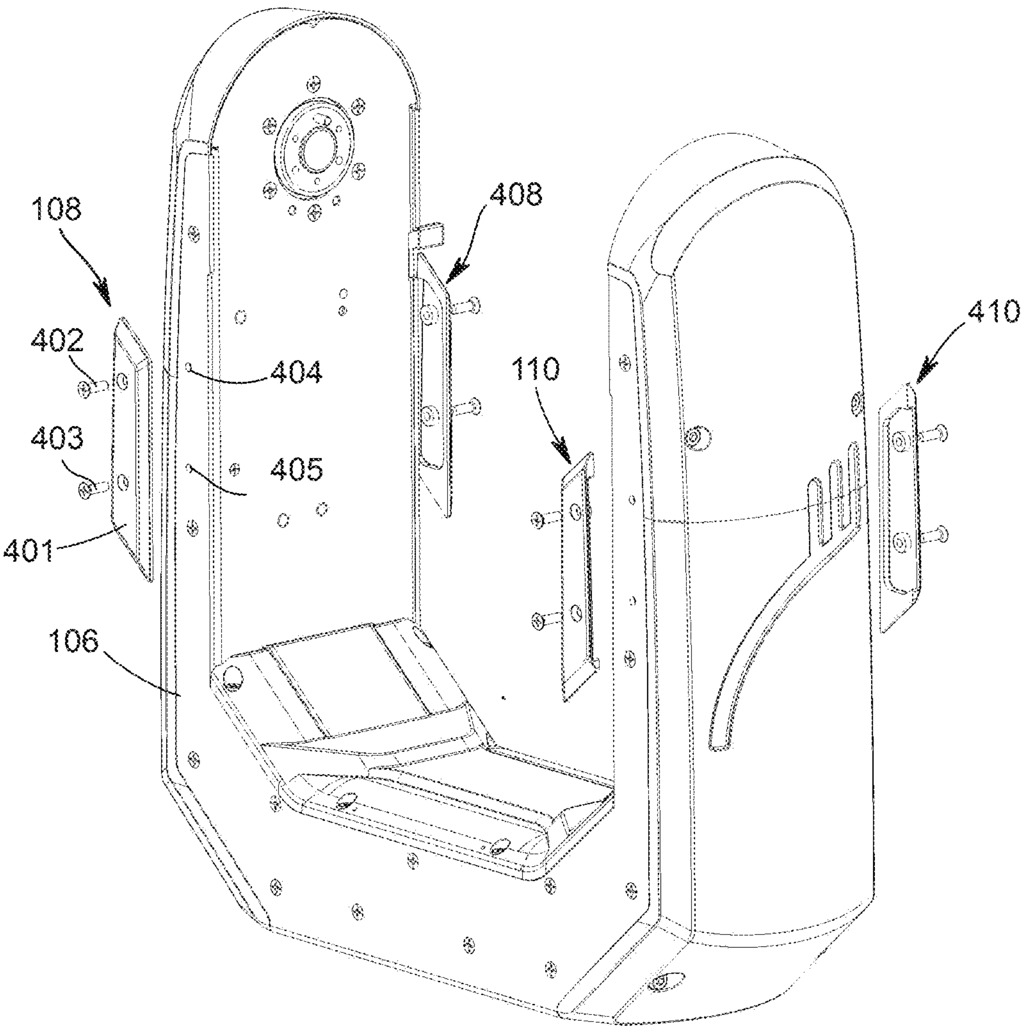
FIG. 4 illustrates a partially exploded view of a yoke of a luminaire optical system, in which the yoke includes handle sockets according to an embodiment of the disclosure.

FIG. 4 presents a partially exploded view of the yoke 106, which illustrates the placement and construction of handle sockets 108, 110, 408, 410 according to an embodiment of the disclosure. In FIG. 4, the handle socket 108 is shown in further detail, and it should be understood that the following details pertaining to the handle socket 108 also may apply to the other sockets 110, 408, 410. In this example, the handle socket 108 includes a cover 401, which is fastened to the arm of the yoke 106 with fixing screws 402, 403. The arm of the yoke 106 includes corresponding threaded holes 404, 405 to receive the fixing screws 402, 403, respectively. It should be appreciated that the fixing screws 402, 403 and the threaded holes 404, 405 are exemplary, and that, in other embodiments, other types of fasteners may be used without departing from the scope of the present disclosure. For example, a nut and bolt may replace each fixing screw, while the hole in the arm of the yoke 106 is unthreaded. In other words, the scope of the present disclosure should not be interpreted as being limited to a particular type of fastener.

In some embodiments, the handle socket 108 may be retrofitted to a legacy luminaire by drilling holes on each side of the arm(s) of the yoke 106. For example, as shown in FIG. 4, each side of each arm of the yoke 106 may be drilled with two holes, and then a cover for each handle socket 108, 110, 408, 410 be fastened to the arm of the yoke 106 with two screws, two nuts/bolts, and the like. That is, in the example of FIG. 4, the luminaire could be retrofitted for attachment to two removable handles with a total of eight drilled holes, eight corresponding fasteners, and four covers to provide the four handle sockets 108, 110, 408, 410.

Figure 5:
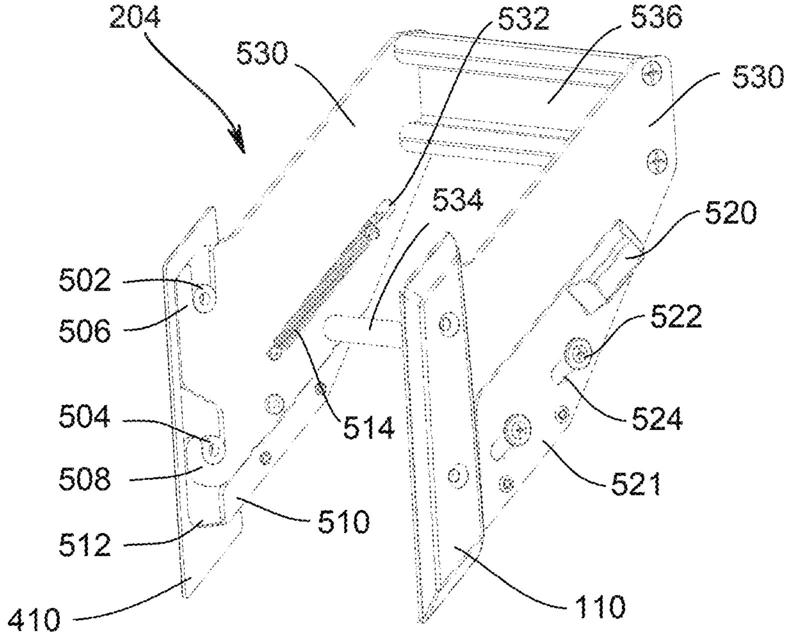
FIG. 5 illustrates an isometric view of a removable handle interfacing with a corresponding handle socket and in a first, locked configuration according to an embodiment of the disclosure.
Figure 6:
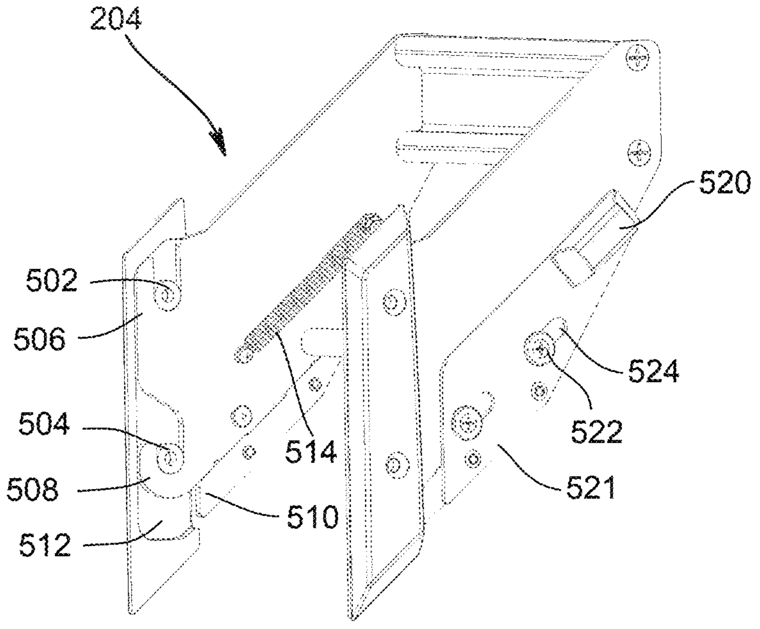
FIG. 6 illustrates an isometric view of a removable handle interfacing with a corresponding handle socket and in a second, unlocked configuration according to an embodiment of the disclosure.

FIGS. 5 and 6 present isometric views of a removable handle 204 interfacing with corresponding handle sockets 110, 410 according to an embodiment of the disclosure. It should be appreciated that the description of FIGS. 5 and 6 may also apply to the removable handle 202, as well as handle sockets 108, 408. It should also be appreciated that both sides of the removable handle 204 are generally similar.

FIG. 5 shows the removable handle 204 in a first, locked configuration, while FIG. 6 shows the removable handle 204 in a second, unlocked configuration.

The removable handle 204 includes handle hooks 506, 508 located at a proximal end of the removable handle 204. The handle hooks 506, 508 are configured to engage with bosses 502, 504 fitted to handle socket 410. For example, the handle hook 506 may form a linear slot, which is configured to receive the boss 502 when the removable handle 204 is attached to the yoke arm, while the handle hook 508 may form a J-slot, which is configured to receive the boss 504 when the removable handle 204 is attached to the yoke arm. The particular shape of the handle hooks 506, 508 may vary from that shown in FIGS. 5 and 6 without deviating from the scope of the present disclosure. For example, the handle hooks 506, 508 may form slots of different shapes, may both form linear slots, may both may form J-slots, and the like. In other words, the scope of the present disclosure should not be interpreted as being limited to handle hooks (or the corresponding slots formed thereby) having a particular shape.

Although not depicted in FIGS. 5 and 6, the fixing screws 402, 403 shown in FIG. 4 are configured to pass through the bosses 502, 504, respectively. In some examples, the bosses 502, 504 are threaded (e.g., corresponding to the threads on fixing screws 402, 403). In other embodiments, the bosses 502, 504 may be unthreaded, such as where the fixing screws 402, 403 are bolts or other unthreaded pins. In an embodiment other than that shown in FIGS. 5 and 6, the bosses 502, 504 may be omitted. In this embodiment, the fixing screws 402, 403 are configured to be load-bearing, and the linear slot formed by the handle hook 506 is configured to receive the fixing screw 402 when the removable handle 204 is attached to the yoke arm, while the J-slot formed by the handle hook 508 is configured to receive the fixing screw 403 when the removable handle 204 is attached to the yoke arm.

The handle socket 410 includes an internal profile 512 that is configured to receive a locking tongue 510 of the removable handle 204. For example, when the removable handle 204 is attached (i.e., the bosses 502, 504 are positioned in the slots formed by the handle hooks 506, 508), the locking tongue 510 is biased by a spring 514 to engage the internal profile 512 of the handle socket 410. Thus, the removable handle 204 in FIG. 5 is in a locked configuration because the locking tongue 510 engages the internal profile 512, which prevents the bosses 502, 504 from being released from (or disengaging) the slots formed by the handle hooks 506, 508. The internal profile 512 is depicted as being vertically asymmetric, and thus is configured to receive the removable handle 204 only as shown (i.e., the removable handle 204 cannot be attached "upside down"). However, in other embodiments, the internal profile 512 may be vertically symmetric or otherwise configured to enable the removable handle 204 to be attached in either direction (i.e., angled toward the head 102 or facing the base 104).

The removable handle 204 includes a body comprising two generally parallel body plates 530. The handle hooks 506, 508 may be formed as part of the body plates 530, or otherwise coupled to the body plates 530. The body of the removable handle 204 includes a grip 536 that is coupled to and extends between the body plates 530. The grip 536 is designed to be the primary lifting point for a user of the removable handle 204 (i.e., with a luminaire 100 attached thereto). The grip 536 is arranged at a distal end of the body of the removable handle 204. The body of the removable handle 204 may also include a crossmember 534 that is coupled to and extends between the body plates 530 to provide additional lateral support therebetween.

The removable handle 204 also includes a corresponding sliding plate 521 for each body plate 530. The corresponding sliding plate 521 is on the outside of the body plate 530 of the removable handle 204 in the depicted embodiment. The sliding plate 521 is configured to slide inward (i.e., along the body plate 530 toward the yoke arm) and outward (i.e., along the body plate 530 away from the yoke arm) on one or more screws 522 passing through one or more corresponding slots 524. The screw 522 may be fixedly coupled to the body plate 530, and thus works in conjunction with the corresponding slot 524 to restrict motion of the sliding plate 521 to an axis defined by the corresponding slot 524.

A first end of the spring 514 may be coupled to an inner surface of the body plate 530, while a second end of the spring 514 is coupled to the sliding plate 521 through a slot 532 in the body plate 530. The locking tongue 510 is connected to the sliding plate 521, and is located at a proximal end of the removable handle 204. As explained above, the spring 514 is configured to bias the locking tongue 510 (via the coupling of the spring 514 to the sliding plate 521) to engage the internal profile 512 of the handle socket 410 (i.e., to be in the locked configuration shown in FIG. 5).

In the embodiment shown in FIG. 5, a knob 520 is coupled to the sliding plate 521, and allows an operator to pull the sliding plate 521 back (i.e., along the body plate 530 away from the yoke arm), which disengages the locking tongue 510 from the internal profile 512. In such an embodiment, the operator would need to simultaneously interact with knobs 520 on both sides of the removable handle 204 (i.e., one knob 520 on the sliding plate 521 on each side of the removable handle 204) in order to allow the removable handle 204 to be released from the yoke arm.

FIG. 6 shows the removable handle 204 in the unlocked configuration, with the knobs 520 on the sliding plates 521 pulled away from the yoke arm. In FIG. 6, the spring 514 is stretched relative to the locked configuration shown in FIG. 5, and thus opposes movement from the locked configuration to the unlocked configuration. In FIG. 6, the locking tongue 510 is disengaged from the internal profile 512, which enables the handle hooks 506, 508 to release the bosses 502, 504, thus enabling the removable handle 204 to be released from the yoke arm.

Figure 7:
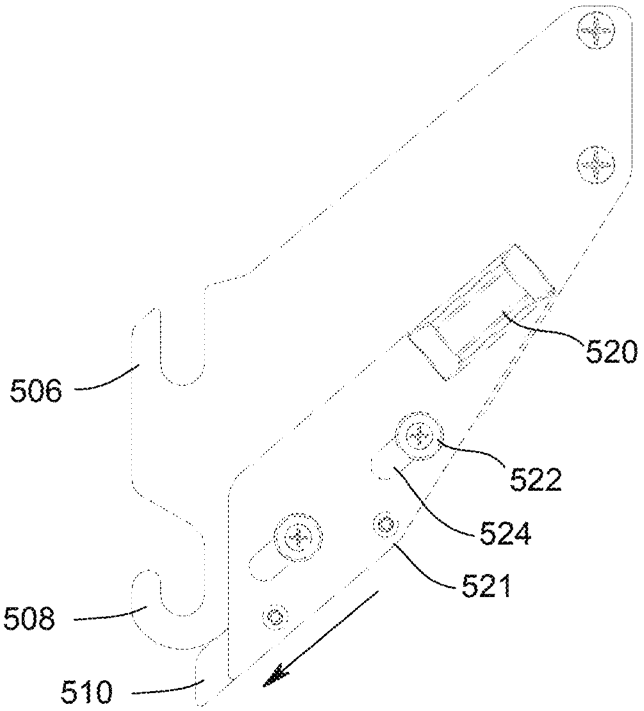
FIG. 7 illustrates a side view of a removable handle in the first, locked configuration according to an embodiment of the disclosure.

FIG. 7 presents a side view of the removable handle 204 in the locked configuration, as described above with respect to FIG. 5. The arrow in FIG. 7 is in the direction of biasing provided by the spring 514 (not shown in FIG. 7).

Figure 8:
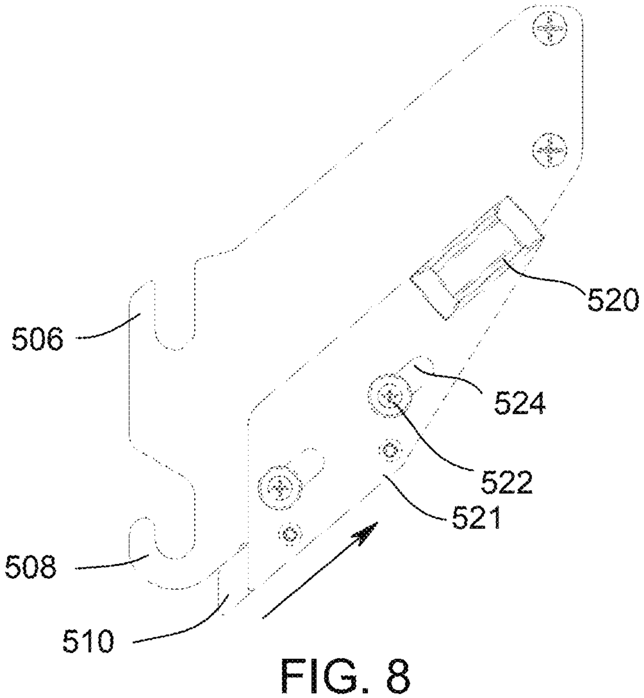
FIG. 8 illustrates a side view of a removable handle in the second, unlocked configuration according to an embodiment of the disclosure.

FIG. 8 presents a side view of the removable handle 204 in the unlocked configuration, as described above with respect to FIG. 6. The arrow in FIG. 8 is in the direction of actuation of the sliding plate 521 by the knob 520 (i.e., being pulled away from the yoke arm). The screws 522 and corresponding slots 524 act as stops to limit the outward movement of the sliding plate 521 away from the yoke arm.

Figure 9:
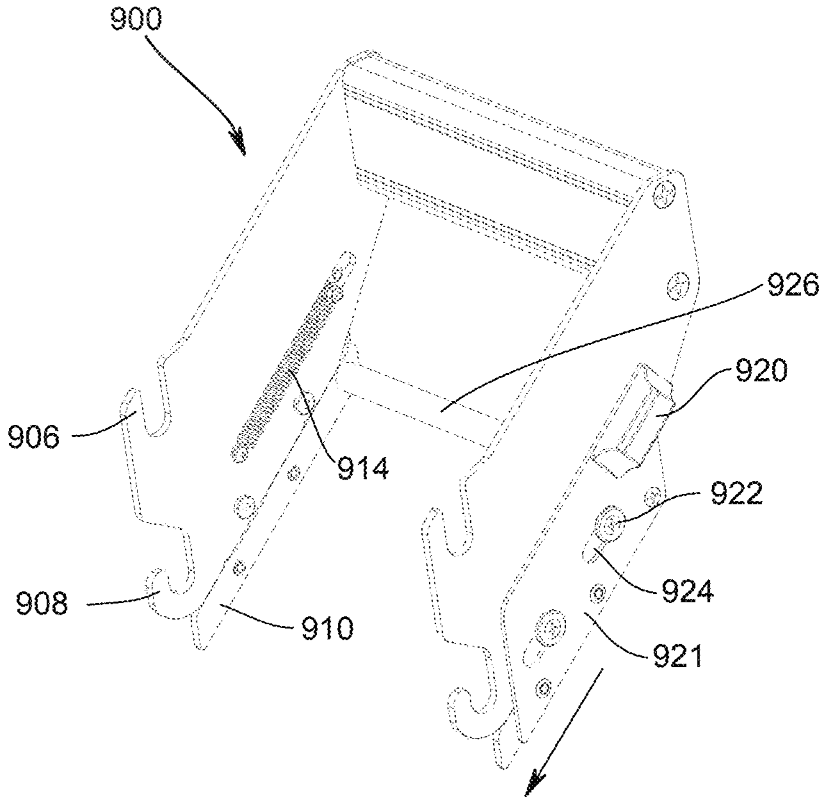
FIG. 9 illustrates an isometric view of the removable handle with a pull bar in the first, locked configuration according to an embodiment of the disclosure.
Figure 10:
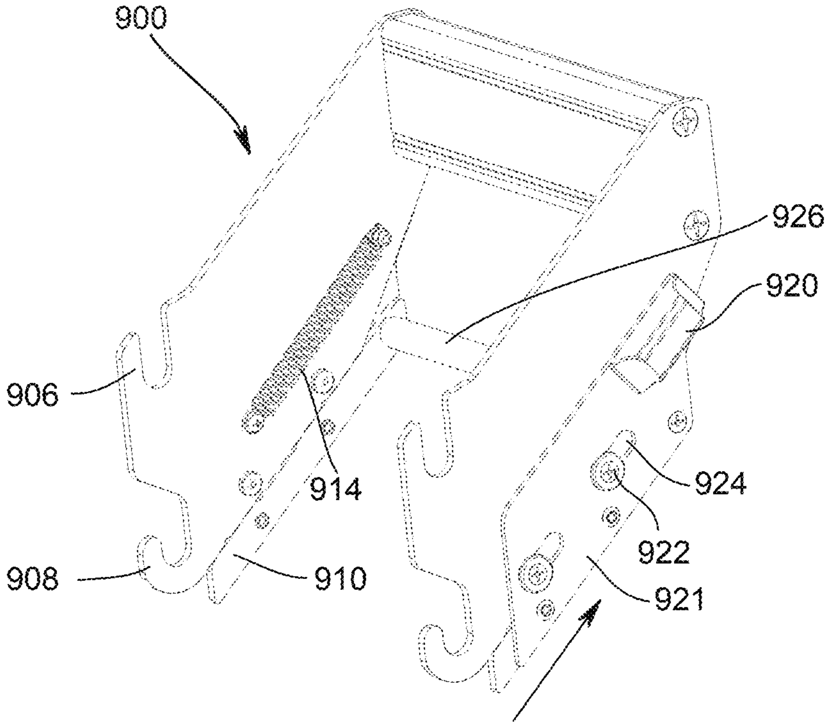
FIG. 10 illustrates an isometric view of the removable handle with a pull bar in the second, unlocked configuration according to an embodiment of the disclosure.

FIGS. 9 and 10 present isometric views of a removable handle 900 in a locked and unlocked configuration, respectively, and with a pull bar 926 according to an embodiment of the disclosure. In FIGS. 9 and 10, handle hooks 906, 908 function similarly to the handle hooks 506, 508 described above with respect to FIGS. 5 and 6. Similarly, locking tongue 910, spring 914, sliding plate 921, screw 922, and slot 924 function similarly to the locking tongue 510, spring 514, sliding plate 521, screw 522, and slot 524 described above with respect to FIGS. 5 and 6.

In the embodiment of FIGS. 9 and 10, the removable handle 900 includes the pull bar 926, which is coupled to the locking tongue 910 and/or the sliding plate 921. Accordingly, the pull bar 926 enables an operator to pull both sliding plates 921 back (i.e., along the body of the removable handle 900 away from the yoke arm), which disengages the locking tongue 910 from the internal profile of a handle socket (not shown in FIGS. 9 and 10 for simplicity). Because the pull bar 926 is coupled to the locking tongue 910 and/or the sliding plate 921 on both sides of the removable handle 900, one-handed operation is enabled. That is, unlike the knobs 520 in FIGS. 5 and 6, which must each be simultaneously operated (e.g., likely using two hands) to disengage both locking tongues 510 from the corresponding internal profiles 512, the pull bar 926 can be operated using just one hand. In some such embodiments, the pull bar 926 is arranged to be sufficiently spaced away from the grip of the removable handle 900 to avoid accidental actuation when a user grips the removable handle 900.

In some embodiments, even though pull bar 926 enables one-handed actuation of both sliding plates 921, the sliding plates 921 may additionally be provided with knobs 920 as a backup or auxiliary mode of engagement, such as if the pull bar 926 was to break or otherwise be rendered inoperable. In such embodiments, the knobs 920 function similarly to the knobs 520 described above with respect to FIGS. 5 and 6.

In accordance with embodiments of this disclosure, the removable handle 900 is able to be mounted to a luminaire 100 for transport and rigging. At the same time, the pull bar 926 enables one-handed disengagement of the removable handle 900 from the luminaire 100, such as when the luminaire 100 is in use, or is packed in a road case. When attached to the luminaire 100, the removable handle 900 may enable handling the luminaire 100 in either head-up or head-down orientations. Although the embodiments shown and described herein generally refer to the removable handles being fitted with the grip facing the head of luminaire 100, in other embodiments, the grip faces the base of the luminaire 100. For example, if the internal profile of the handle sockets is asymmetric, the handle sockets may be reversed to enable the removable handle to be attached upside down (i.e., with the grip facing the base of the luminaire 100). On the other hand, if the internal profile of the handle sockets is symmetric, the removable handles may be attached to the handle sockets either as shown herein, or upside down.

While only some embodiments of the disclosure have been described herein, those skilled in the art, having benefit of this disclosure, will appreciate that other embodiments may be devised which do not depart from the scope of the disclosure herein. While the disclosure has been described in detail, it should be understood that various changes, substitutions, and alterations can be made hereto without departing from the spirit and scope of the disclosure.

What is claimed is:

1. A luminaire system, comprising:

a luminaire, comprising a yoke configured for rotation relative to a fixed enclosure of the luminaire, wherein the yoke comprises a yoke arm having a pair of handle sockets, and wherein each handle socket has an interior profile; and a removable handle, comprising:

a body comprising a pair of body plates and a grip extending therebetween;

a respective pair of handle hooks coupled to each body plate, and configured to engage a corresponding one of the handle sockets;

a respective sliding plate coupled to and configured to slide along each body plate between a locked configuration and an unlocked configuration, wherein a locking tongue is coupled to each sliding plate and is configured to extend from a proximal end of the removable handle to engage the interior profile of the handle socket in the locked configuration; and a pull bar coupled to each sliding plate and/or each locking tongue.

2. The luminaire system of claim 1, wherein the removable handle further comprises a spring coupled to one of the body plates and the respective sliding plate, wherein the spring is configured to bias the locking tongue coupled to the respective sliding plate to be in the locked configuration.

3. The luminaire system of claim 2, wherein the pull bar is configured for one-handed operation, and to be pulled away from the yoke arm to move both sliding plates and both locking tongues into the unlocked configuration.

4. The luminaire system of claim 1, further comprising a respective knob coupled to an external surface of each sliding plate.

5. The luminaire system of claim 1, wherein the interior profile is vertically symmetric.

6. The luminaire system of claim 1, wherein the interior profile is vertically asymmetric.

7. The luminaire system of claim 1, wherein the luminaire comprises a base that includes a pair of secondary handle sockets, and wherein each secondary handle socket has an interior profile that corresponds to the interior profile of the handle sockets of the yoke.

8. A removable handle for a luminaire, comprising:

a body comprising a pair of body plates and a grip extending therebetween;

a respective pair of handle hooks coupled to each body plate, and configured to engage a corresponding handle socket of a yoke arm of a luminaire;

a respective sliding plate coupled to and configured to slide along each body plate between a locked configuration and an unlocked configuration, wherein a locking tongue is coupled to each sliding plate and is configured to extend from a proximal end of the removable handle to engage an interior profile of the handle socket in the locked configuration; and a pull bar coupled to each sliding plate and/or each locking tongue.

9. The removable handle of claim 8, further comprising a spring coupled to one of the body plates and the respective sliding plate, wherein the spring is configured to bias the locking tongue coupled to the respective sliding plate to be in the locked configuration.

10. The removable handle of claim 9, wherein the pull bar is configured for one-handed operation, and to be pulled toward a distal end of the removable handle to move both sliding plates and both locking tongues into the unlocked configuration.

11. The removable handle of claim 8, further comprising a respective knob coupled to an external surface of each sliding plate.

* * * * *